(12) United States Patent
Necas et al.

(10) Patent No.: US 9,940,480 B2
(45) Date of Patent: Apr. 10, 2018

(54) SECURING DELEGATED REMOTE MANAGEMENT WITH DIGITAL SIGNATURE

(71) Applicant: Red Hat, Inc., Raleigh, NC (US)

(72) Inventors: Ivan Necas, Brno (CZ); Marek Hulan, Brno (CZ)

(73) Assignee: Red Hat, Inc., Raleigh, NC (US)

(*) Notice: Subject to any disclaimer, the term of this patent is extended or adjusted under 35 U.S.C. 154(b) by 225 days.

(21) Appl. No.: 15/053,820

(22) Filed: Feb. 25, 2016

(65) Prior Publication Data

US 2017/0249477 A1 Aug. 31, 2017

(51) Int. Cl.
*G06F 21/62* (2013.01)
*G06F 21/64* (2013.01)
*H04L 29/06* (2006.01)

(52) U.S. Cl.
CPC .......... *G06F 21/6245* (2013.01); *G06F 21/64* (2013.01); *H04L 63/0428* (2013.01); *H04L 63/06* (2013.01); *H04L 63/08* (2013.01)

(58) Field of Classification Search
None
See application file for complete search history.

(56) References Cited

U.S. PATENT DOCUMENTS

| | | | |
|---|---|---|---|
| 6,189,103 B1 | 2/2001 | Nevarez et al. | |
| 6,418,484 B1* | 7/2002 | Radia | G06F 9/547 709/228 |
| 6,601,171 B1* | 7/2003 | Carter | H04L 63/08 380/30 |
| 6,742,114 B1* | 5/2004 | Carter | H04L 63/08 709/201 |
| 7,117,366 B2 | 10/2006 | Vincent | |

(Continued)

OTHER PUBLICATIONS

Edicom, Remote Signature, http://www.edicomgroup.com/edicom-connecting-business/certification-authority/services/digital_signature.html, (3 pages).

(Continued)

*Primary Examiner* — Saleh Najjar
*Assistant Examiner* — Louis Teng
(74) *Attorney, Agent, or Firm* — K&L Gates LLP

(57) ABSTRACT

A system and method of executing a script includes receiving, by a service user account module, a user script from a first user account. The method includes issuing, by a management system, execution data including the user script and validation parameters. The method includes signing, by the management system, the execution data with a private key. Responsive to signing the execution data, the execution data further includes a digital signature. The method further includes authorizing, by the management system, communication to a remote execution tool, where authorization requires the digital signature. The method further includes sending, to the remote execution tool, the execution data including the digital signature. The method further includes confirming, by the remote execution tool, the validation parameters. The method further includes, responsive to confirming the validation parameters, executing, by the remote execution tool, the user script on a remote system for the first user account.

20 Claims, 4 Drawing Sheets

(56) References Cited

U.S. PATENT DOCUMENTS

| | | | |
|---|---|---|---|
| 7,565,544 B1* | 7/2009 | Eatough | G06F 21/51 713/161 |
| 7,698,736 B2 | 4/2010 | Mcgarvey et al. | |
| 8,285,999 B1* | 10/2012 | Ghose | G06F 21/54 713/170 |
| 8,489,880 B1* | 7/2013 | Gagnon | H04L 9/3215 713/176 |
| 8,549,586 B2 | 10/2013 | Mendel et al. | |
| 8,850,193 B2 | 9/2014 | Fanton et al. | |
| 2001/0011254 A1* | 8/2001 | Clark | G06F 21/125 705/59 |
| 2007/0240160 A1* | 10/2007 | Paterson-Jones | G06F 8/60 718/104 |
| 2010/0281173 A1 | 11/2010 | Vutukuri et al. | |
| 2014/0053072 A1* | 2/2014 | Guo | G06F 9/468 715/736 |
| 2015/0229477 A1 | 8/2015 | Blair et al. | |

OTHER PUBLICATIONS

Omaima Bamasak and Ning Zhang, A Secure Method for Signature Delegation to Mobile Agents, Mar. 14-17, 2004, Department of Computer Science, University of Manchester (6 pages).

Nexus Group, Your Key to Secure Digital Access: Authentication, Digital Access and Signature Management, Dec. 23, 2015, http://www.nexusgroup.com/en/solutions/authentication-digital-access-and-signature-managemnet-aas/ (6 pages).

* cited by examiner

SECURING DELEGATED REMOTE MANAGEMENT WITH DIGITAL SIGNATURE

BACKGROUND

The present disclosure relates generally to script execution and, more particularly, to methods and systems for executing a script. Scripts may act as commands dictated to various computer systems, networks, etc. to take particular actions. Through scripts, outside actors (e.g., external user accounts), may send commands to computer systems. For example, user accounts may send a number of different commands to a number of different computer systems. Thus, centralization and management of scripts are key concerns.

There are also a number of security concerns related to scripts and script execution that may impact computer systems in negative ways. For example, when executing scripts by a computer system, ideally the script is executed for a particular user account, satisfying particular security protocols. Failure to properly execute scripts for particular user accounts may result in scripts being executed at improper locations, such as the wrong remote location, or by the incorrect user account. Likewise, failure to fulfil particular security protocols may lead to inappropriate script executions, which may subsequently lead to a computer system taking undesirable computer actions.

SUMMARY

The present disclosure provides new and innovative methods and systems for executing a script. For example, the method includes receiving, by a service user account module, a user script from a first user account. The method further includes issuing, by a management system, execution data. The execution data includes the user script and a plurality of validation parameters. The method further includes signing, by the management system, the execution data with a private key. Responsive to signing the execution data, the execution data further includes a digital signature. The method further includes authorizing, by the management system, communication to a remote execution tool. Authorization requires the digital signature. The method further includes sending, to the remote execution tool, the execution data including the digital signature. The method further includes confirming, by the remote execution tool, the plurality of validation parameters. The method further includes, responsive to confirming the plurality of validation parameters, executing, by the remote execution tool, the user script on a remote system for the first user account.

Additional features and advantages of the disclosed methods and system are described in, and will be apparent from, the following Detailed Description and the Figures.

DETAILED DESCRIPTION OF EXAMPLE EMBODIMENTS

Figure 1:
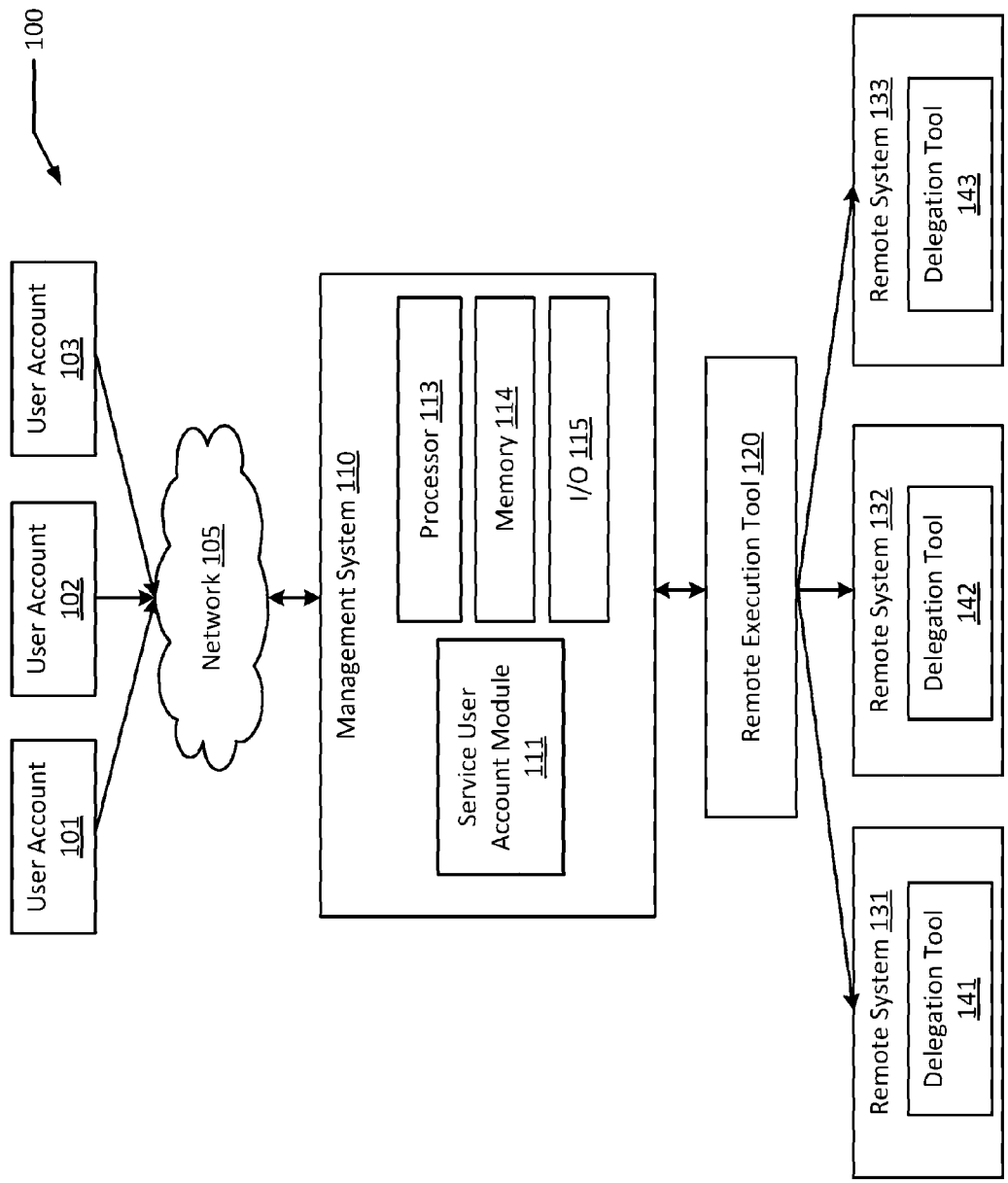
FIG. 1 is a block diagram of an example script execution system according to an example embodiment of the present disclosure.

FIG. 1 is a block diagram of an example script execution system according to an example embodiment of the present disclosure. The computer system 100 may include one or more user accounts including a first user account 101, a second user account 102, and a third user account 103, connected to a management system 110. In an example embodiment, each of the first user account 101, the second user account 102, and the third user account 103 may be different accounts operating on the same computer. In a different example embodiment, each of the first user account 101, the second user account 102, and the third user account 103 may be different accounts operating on different computers. As described herein, a user account 101-103 may provide requests (e.g., a request to execute a script) on behalf of a user based on user inputs to a user computer. In an example embodiment, the user accounts 101-103 are connected directly to the management system 110. In a different example embodiment, the user accounts 101-103 are connected to the management system 110 via network 105 (e.g., the Internet).

The management system 110 may include a service user account module 111. The service user account module 111 may be in direct communication with the user accounts 101-103. The management system 110 may include additional components, such as a processor 113, a memory 114, and additional input/output (I/O) devices 115. Local connections, including the connections between processor 113 and memory 114 and between processor 113 and I/O device 115, may be provided by one or more local buses of suitable architecture, for example, peripheral component interconnect (PCI).

As used herein, a physical processor or processors 113 refer to a device capable of executing instructions encoding arithmetic, logical, and/or I/O operations. In one illustrative example, a processor may follow Von Neumann architectural model and may include an arithmetic logic unit (ALU), a control unit, and a plurality of registers. In an example embodiment, a processor may be a single core processor which is typically capable of executing one instruction at a time (or process a single pipeline of instructions), or a multi-core processor which may simultaneously execute multiple instructions. In another example embodiment, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

As discussed herein, a memory 114 refers to a volatile or non-volatile memory device, such as RAM, ROM, EEPROM, or any other device capable of storing data. As discussed herein, input/output device 115 refers to a device capable of providing an interface between one or more processors and an external device. The external device's operation is based on the processor inputting and/or outputting data.

The computer system 100 may further include remote execution tool 120. In an example embodiment, remote execution tool 120 is in communication with management system 110. Likewise, remote execution tool 120 may be in communication with a number of remote systems including first remote system 131, second remote system 132, and third remote system 133. The management system 110 is the centralized system that provides user accounts 101-103 with control over the remote systems 131-133.

Each of the remote systems 131-133 may include a delegation tool 141-143. For example, the first remote system 131 may include a first delegation tool 141. Also, for example, the second remote system 132 may include a second delegation tool 142. Also, for example, the third remote system 133 may include a third delegation tool 143. In an example embodiment, the delegation tools (e.g., first delegation tool 141) are sudo programs. In an example embodiment, the sudo programs may be programs for operating systems that allows a user account (e.g., first user account 101) to run programs with security privileges of another user account (e.g., second user account 102) or, by default, a super-user (e.g., the service user account module 111).

Figure 2:
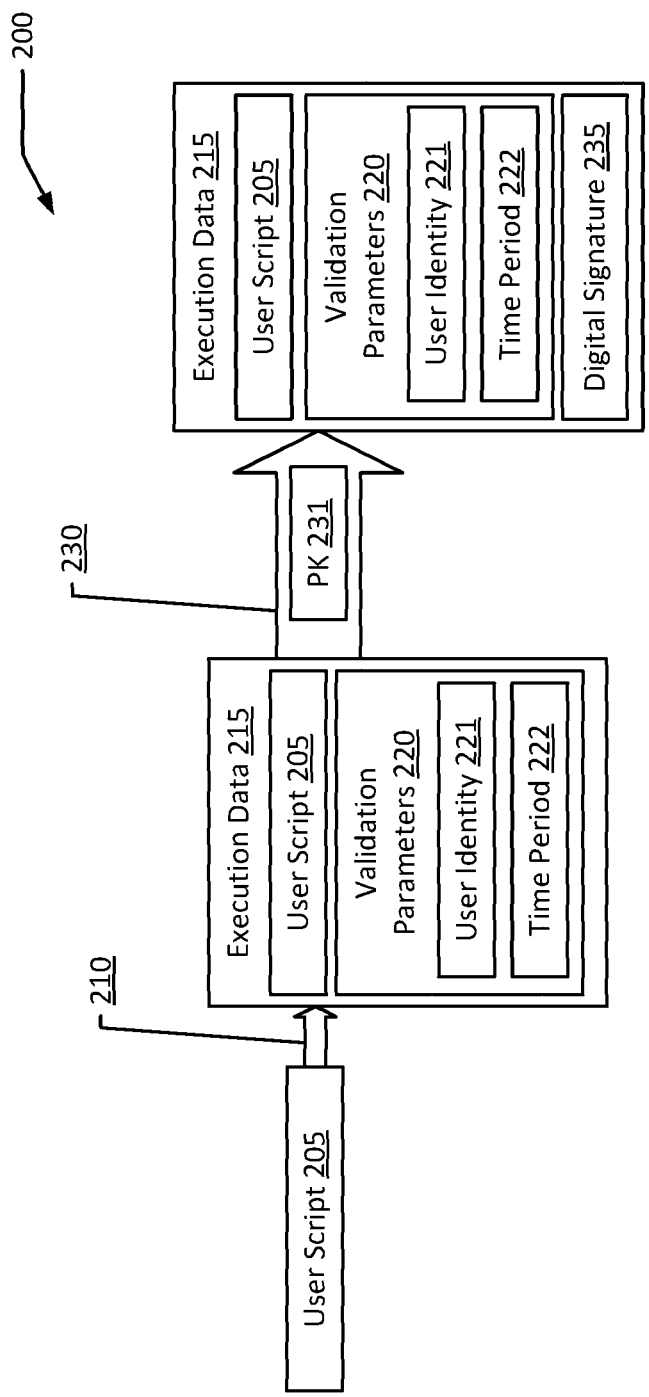
FIG. 2 is a diagram illustrating a user script and additional script components according to an example embodiment of the present disclosure.

FIG. 2 is a diagram illustrating a user script and additional script components according to an example embodiment of the present disclosure. Initially, in this embodiment 200, user script 205 contains basic information (e.g., a command). In an example embodiment, the user script 205 contains sensitive information. For example, user script 205 may be a script to change a user account's (e.g., first user account 101) password on a system (e.g., first remote system 131). In an alternate example, user script 205 may be a script to backup data for a user account (e.g., second user account 102) on a system (e.g., second remote system 132). Also, for example, user script 205 may be a script to schedule a server restart on a system (e.g., third remote system 133).

The management system 110 then issues execution data 215 (block 210). The newly issued execution data 215 includes the user script 205 and a number of validation parameters 220. For example, the validation parameter of user identity 221 is included by the execution data 215 (e.g., user script 205 may only be executed by a first user account 101). Likewise, for example, the validation parameter of time period 222 is included by the execution data 215 (e.g., user script 205 may only be executed within the next five minutes). Likewise, for example, validation parameters 220 may include both user identity 221 and time period 222 simultaneously (e.g., user script 205 may only be executed by the first user account 101 within the next five minutes). In an example embodiment, validation parameters 220 are issued, by the management system 110 in connection with the service user account module 111. Thus, the user identity 221 may be ascertained from the user accounts 101-103 directly. In an example embodiment, the time period 222 begins when the user script 205 is received by the service user account module 111.

The management system 110 then signs the execution data 215 with a private key 231 (block 230). In an example embodiment, the private key 231 is pre-configured. In a related example embodiment, the private key 231 is confidential to its respective owner (e.g., the management system 110 is unaware of the specific contents of the private key 231). By signing the execution data 215 with the private key 231, the execution data further includes a digital signature 235.

Figure 3:
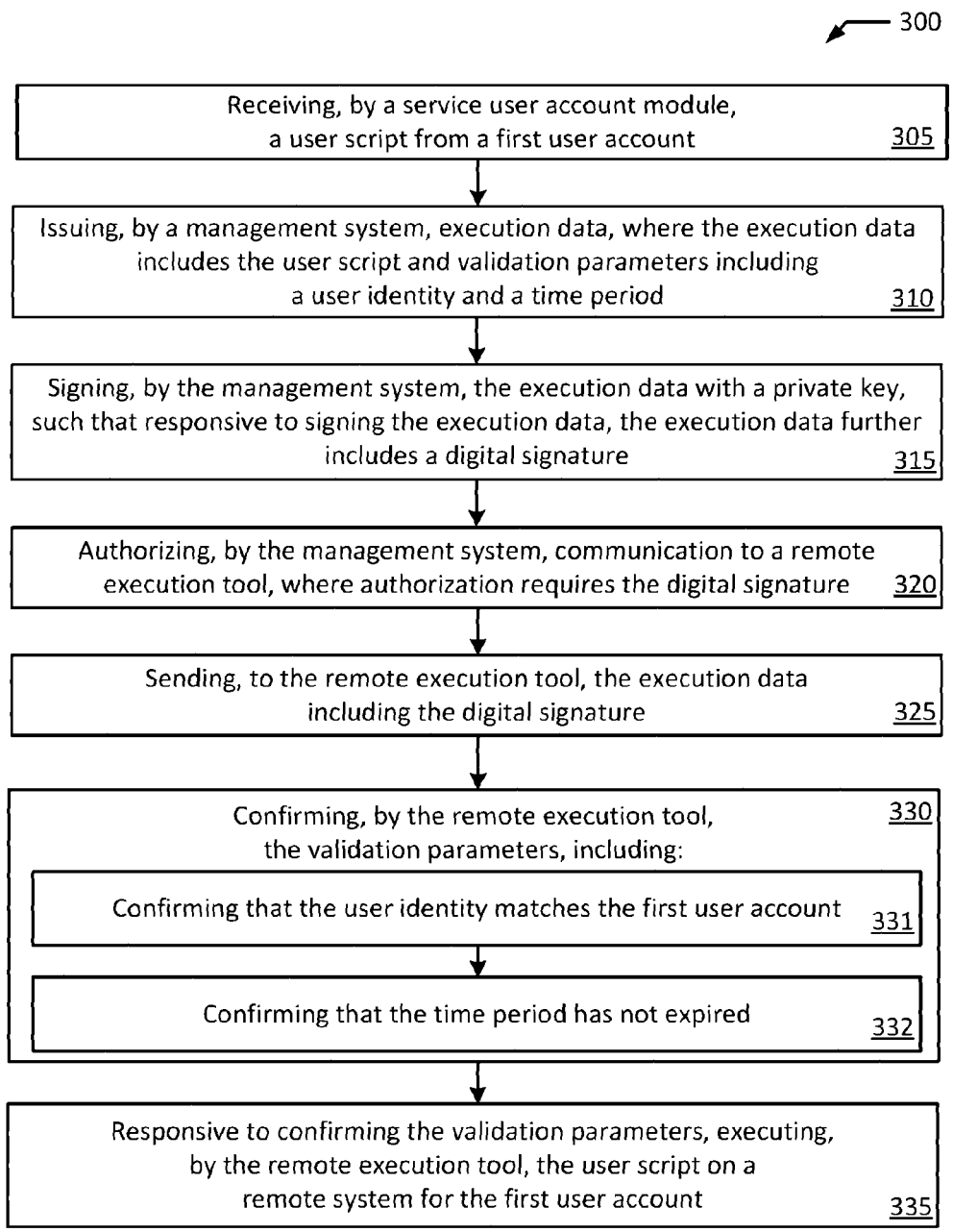
FIG. 3 is a flowchart illustrating an example method of script execution according to an example embodiment of the present disclosure.

FIG. 3 is a flowchart illustrating an example method of script execution according to an example embodiment of the present disclosure. Although the example method 300 is described with reference to the flowchart illustrated in FIG. 3, it will be appreciated that many other methods of performing the acts associated with the method 300 may be used. For example, the order of some of the blocks may be changed, certain blocks may be combined with other blocks, and some of the blocks described are optional. The method 300 may be performed by processing logic that may include hardware (circuitry, dedicated logic, etc.), software, or a combination of both. In an example embodiment, the method is performed by a management system 110 interacting with a remote execution tool 120, a remote system 131, a service user account module 111, and a first user account 101. In other example embodiments, the method is performed using other memory systems (e.g., an external computer system).

The example method 300 starts with receiving, by a service user account module 111, a user script 205 (block 305). The user script 205 is sent from a first user account 101. In an example embodiment, the user script 205 includes sensitive information. The method 300 further includes issuing, by a management system 110, execution data 215 (block 310). In an example embodiment, the user script 205 is verified with a public key, by the management system 110, before the management system 110 issues execution data 215. For example, the public key verifies standard information associated with the user script 205 (e.g., https address). In an example embodiment, the public key is stored on a repository or directory, and is available to the user accounts 101, 102, and 103. In a related example embodiment, public key verification is pre-configured on the management system 110. In an example embodiment, the execution data 215 includes the user script 205 and validation parameters 220. Validation parameters 220 may include a user identity 221 and a time period 222.

The method 300 further includes signing, by the management system 110, the execution data 215 with a private key 231 (block 315). In an example embodiment, signing the execution data 215 includes encrypting the user script 205, such that the user script 205 is decrypted by the remote execution tool 120. In a related example embodiment, execution data 215 is symmetrically encrypted with a pre-shared key. Responsive to signing the execution data 215, the execution data 215 further includes a digital signature 235.

In an example embodiment, the private key 231 resides on a third party computer, such that signing the execution data 215 includes sending, from the management system 110 to the third party computer, the execution data 215. The third party computer receives the execution data 215 and signs the execution data 215 with the private key 231, such that the execution data 215 includes the digital signature 235. Then, the third party computer sends, to the management system 110, the execution data 215.

The method 300 further includes authorizing, by the management system 110, communication to a remote execution tool 120 (block 320). For example, authorization requires the digital signature 235. The method 300 further includes sending, to the remote execution tool 120, the execution data 215 including the digital signature 235 (block 325). For example, the management system 110 may send the execution data 215 over a local area network to the remote execution tool 120.

The method 300 further includes confirming, by the remote execution tool 120, the validation parameters 220 (block 330). This confirmation may include confirming that the user identity 221 matches the first user account 101 (block 331). This confirmation may further include confirming that the time period 222 has not expired (block 332). Responsive to confirming the validation parameters 220, the method 300 further includes executing, by the remote execution tool 120, the user script 205 on a remote system 131 for the first user account 101 (block 335). In an example embodiment, responsive to confirming the validation parameters 220, the user script 205 is immediately executed by the remote execution tool 120. In a different example embodiment, responsive to confirming the validation parameters 220, the user script 205 is not immediately executed by the remote execution tool 120; rather, execution of the user script 205 occurs at a later time.

Figure 4:
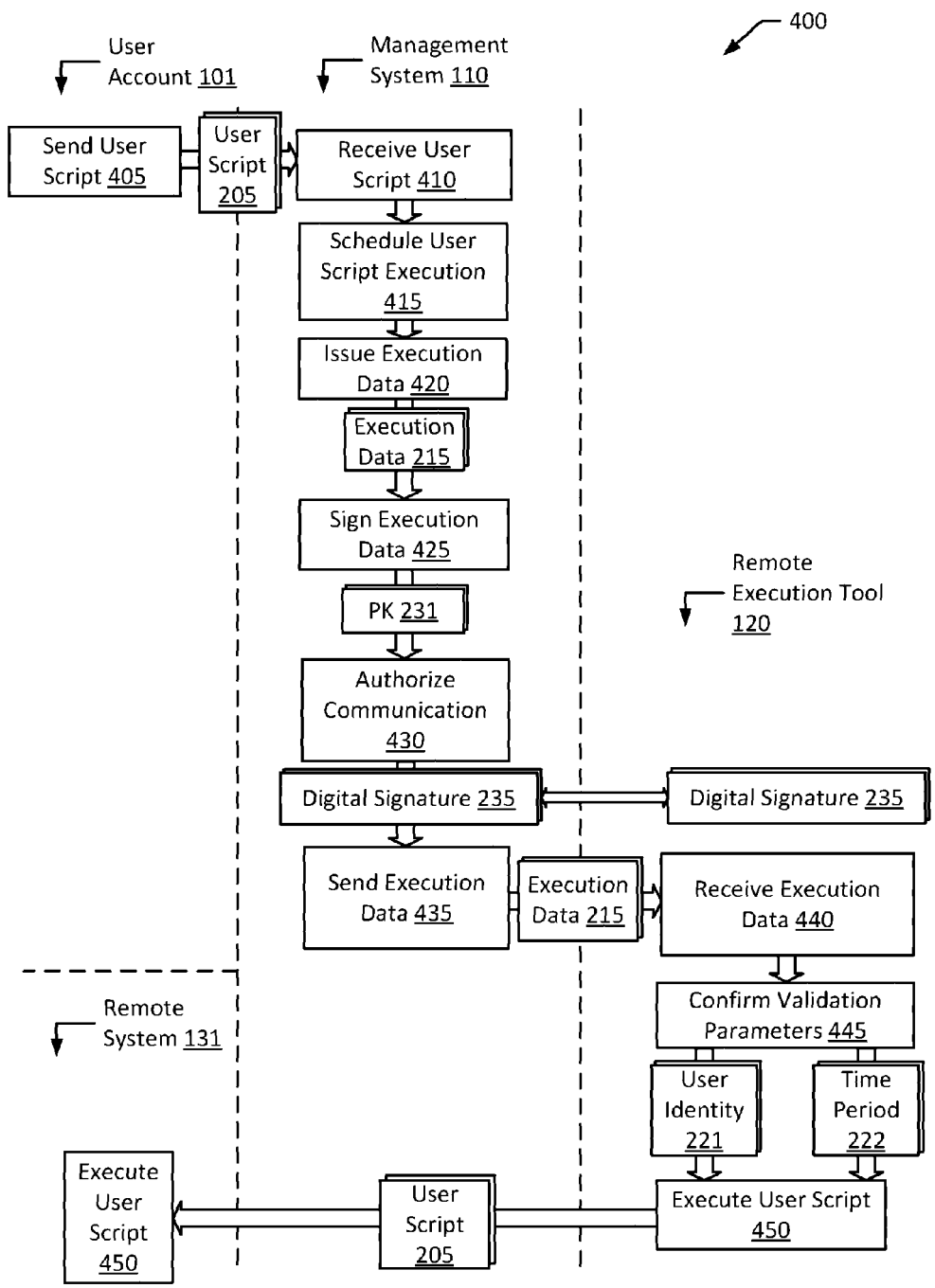
FIG. 4 is a flow diagram illustrating script execution according to an example embodiment of the present disclosure.

FIG. 4 is a flow diagram illustrating script execution according to an example embodiment of the present disclosure. Although the example method 400 is described with reference to the flowchart illustrated in FIG. 4, it will be appreciated that many other methods of performing the acts associated with the method may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both.

In the illustrated example embodiment in FIG. 4, a user account 101 sends a user script 205 to a management system 110 (block 405). The management system 110 receives the user script 205 (block 410). In an example embodiment, a service user account module 111, as a part of the management system 110, receives the user script 205. For example, the user script 205 may be a script to change password on first remote system 131 for first user account 101. In an example embodiment, the management system 110, through the service user account module 111, batches or schedules execution of user scripts (e.g., user script 205) (block 415). For example, when batching, the service user account module 111 will wait to receive a certain number of scripts (e.g., 100 scripts) before the management system 110 will issue execution data 215. Likewise, for example, when scheduling, the service user account module 111 will wait for a certain time (e.g., midnight every night) before the management system 110 will issue execution data 215. The management system 110 issues execution data 215 (block 420). In an example embodiment, the execution data 215 includes the user script 205 and validation parameters 220. In an example embodiment, validation parameters 220 include a user identity 221 and a time period 222.

The management system 110 signs the execution data 215 with a private key 231 (block 425). In an example embodiment, signing with the private key 231 may further encrypt the user script 205, for example, since the user script 205 may contain sensitive data, such as password information, the user script 205 is encrypted. Responsive to signing the execution data 215, the execution data 215 further includes a digital signature 235.

The management system 110 authorizes communication to a remote execution tool 120 (block 430). In an example embodiment, the remote execution tool 120 is a secure shell interface and protocol for accessing a remote computer (e.g., first remote system 131). In an example embodiment, authorization of communication between the management system 110 and the remote execution tool 120 requires the digital signature 235. The management system 110 sends, to the remote execution tool 120, the execution data 215 (block 435). For example, the management system 110 sends the execution data 215 including the user script 205, the validation parameters 220, and the digital signature 235.

The remote execution tool 120 receives execution data 215 from the management system 110 (block 440). The remote execution tool 120 confirms the validation parameters 220 (block 445). For example, this confirmation includes confirming that the user identity 221 matches the first user account 101. Also, for example, this confirmation may further include confirming that the time period 222 has not expired. Responsive to confirming the validation parameters 220, the remote execution tool 120 executes the user script 205 on a remote system 131 for the first user account 101 (block 450). For example, executing the user script 205 changes the password for the first user account 101 on remote system 131.

In a related example embodiment, prior to execution of the user script 205 on the remote system 131, the delegation tool 141 switches the first user account 101 with a second user account 102. By doing so, the user script 205 is executed (block 450), by the remote execution tool 120 for the second user account 102 even though the script was originally received by the service user account module 111 from the first user account 101. In a related example embodiment, the delegation tool 141 switches a service user account (e.g., the service user account module 111) with a real user account (e.g., user account 101), such that the user script 205 is executed, by the remote execution tool 120, as the real user account (e.g., user account 101).

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of executing a script, the method comprising:
   receiving, by a service user account module, a user script from a first user account;
   issuing, by a management system, execution data, wherein the execution data includes:
   the user script; and
   a plurality of validation parameters;
   signing, by the management system, the execution data with a private key, such that responsive to signing the execution data, the execution data further includes a digital signature;
   authorizing, by the management system, communication to a remote execution tool, wherein authorization requires the digital signature;
   sending, to the remote execution tool, the execution data including the digital signature;
   confirming, by the remote execution tool, the plurality of validation parameters; and responsive to confirming the plurality of validation parameters, executing, by the remote execution tool, the user script on a remote system for the first user account.

2. The method of claim 1, wherein the plurality of validation parameters include a user identity and a time period.

3. The method of claim 2, wherein confirming the plurality of validation parameters includes:
confirming that the user identity matches the first user account; and
confirming that the time period has not expired.

4. The method of claim 1, further comprising switching, by a delegation tool, the first user account with a second user account, such that the user script is executed, by the remote execution tool, by the second user account.

5. The method of claim 4, wherein the delegation tool is a sudo program.

6. The method of claim 1, wherein execution of the user script, by the remote execution tool, occurs immediately upon confirmation of the plurality of validation parameters.

7. The method of claim 1, wherein execution of the user script, by the remote execution tool, occurs at a later time after confirmation of the plurality of validation parameters.

8. The method of claim 1, wherein the user script is verified with a public key, by the management system, before the management system issues execution data.

9. The method of claim 8, wherein public key verification is pre-configured on the management system.

10. The method of claim 1, wherein the private key is pre-configured.

11. The method of claim 1, wherein the private key resides on a third party computer, such that signing the execution data further comprises:
sending, from the management system to the third party computer, the execution data;
receiving, at the third party computer, the execution data;
signing, by the third party computer, the execution data with the private key, such that the execution data further includes the digital signature; and
sending, to the management system from the third party computer, the execution data.

12. The method of claim 1, wherein the execution data is symmetrically encrypted with a pre-shared key.

13. The method of claim 1, wherein the user script contains sensitive data.

14. The method of claim 13, wherein signing, by the management system, the execution data includes encrypting the user script, such that the user script is decrypted by the remote execution tool.

15. A system of script execution, the system comprising:
a memory;
one or more processors, in communication with the memory;
a plurality of user accounts, including at least a service user account and a real user account, in communication with the one or more processors;
a remote system, in communication with the one or more processors;
a remote execution tool, configured to execute on the one or more processors; and
a management system, including a service user account module, configured to execute on the one or more processors, to:
receive, by the service user account module, a user script from the service user account;
issue execution data, wherein the execution data includes:
the user script; and
a plurality of validation parameters;
sign the execution data with a private key, such that responsive to signing the execution data, the execution data further includes a digital signature;
authorize communication to the remote execution tool, wherein authorization requires the digital signature; and
send, to the remote execution tool, the execution data including the digital signature;
wherein the remote execution tool:
confirms the plurality of validation parameters; and
responsive to confirming the plurality of validation parameters, executes the user script on the remote system as the service user account.

16. The system of claim 15, wherein the plurality of validation parameters include a user identity and a time period.

17. The system of claim 16, wherein confirming the plurality of validation parameters includes:
confirming that the user identity matches the service user account; and
confirming that the time period has not expired.

18. The system of claim 15, wherein the remote system includes a delegation tool, which is configured to switch the service user account with the real user account, such that the user script is executed, by the remote execution tool, as the real user account.

19. The system of claim 18, wherein the delegation tool is a sudo program.

20. A computer-readable non-transitory storage medium comprising executable instructions that, when executed, are configured to cause a management system to:
receive, by a service user account module, a user script from a service user account;
issue execution data, wherein the execution data includes:
the user script; and
a plurality of validation parameters;
sign the execution data with a private key, such that responsive to signing the execution data, the execution data further includes a digital signature;
authorize communication to a remote execution tool, wherein authorization requires the digital signature; and
send, to the remote execution tool, the execution data including the digital signature;
wherein the remote execution tool:
confirms the plurality of validation parameters; and
responsive to confirming the plurality of validation parameters, executes the user script on the remote system as the service user account.

* * * * *